US011770311B2

(12) United States Patent
Bothe et al.

(10) Patent No.: US 11,770,311 B2
(45) Date of Patent: Sep. 26, 2023

(54) AUTOMATIC AND DYNAMIC PERFORMANCE BENCHMARKING AND SCORING OF APPLICATIONS BASED ON CROWDSOURCED TRAFFIC DATA

(71) Applicant: Palo Alto Networks, Inc., Santa Clara, CA (US)

(72) Inventors: John Bothe, Mount Eliza (AU); Hristos Siakou, Ivanhoe East (AU); Con Nikolouzakis, Doncaster (AU)

(73) Assignee: Palo Alto Networks, Inc., Santa Clara, CA (US)

( * ) Notice: Subject to any disclaimer, the term of this patent is extended or adjusted under 35 U.S.C. 154(b) by 63 days.

(21) Appl. No.: 16/840,151

(22) Filed: Apr. 3, 2020

(65) Prior Publication Data

US 2020/0322235 A1    Oct. 8, 2020

Related U.S. Application Data

(60) Provisional application No. 62/829,861, filed on Apr. 5, 2019.

(51) Int. Cl.

| H04L 12/00 | (2006.01) |
|---|---|
| H04L 43/022 | (2022.01) |
| H04L 43/16 | (2022.01) |
| H04L 43/062 | (2022.01) |
| H04L 43/12 | (2022.01) |
| H04L 43/04 | (2022.01) |
| H04L 43/0876 | (2022.01) |

(52) U.S. Cl.
CPC ............ *H04L 43/022* (2013.01); *H04L 43/04* (2013.01); *H04L 43/062* (2013.01); *H04L 43/0876* (2013.01); *H04L 43/12* (2013.01); *H04L 43/16* (2013.01)

(58) Field of Classification Search
CPC ... H04L 43/16; H04L 43/062; H04L 41/5067; H04L 43/04; H04L 43/12; H04L 43/022; H04L 43/0876
USPC .......................................... 709/224; 707/827
See application file for complete search history.

(56) References Cited

U.S. PATENT DOCUMENTS

| 5,245,498 | A  | * | 9/1993 | Uchida ................ | H02H 1/0015 |
|---|---|---|---|---|---|
|  |  |  |  |  | 361/47 |
| 5,819,066 | A  | * | 10/1998 | Bromberg ........... | G06F 11/3428 |
|  |  |  |  |  | 707/827 |
| 6,754,612 | B1 | * | 6/2004 | Vanfladern .......... | G06F 11/3428 |
|  |  |  |  |  | 702/186 |

(Continued)

*Primary Examiner* — Frantz Coby
(74) *Attorney, Agent, or Firm* — GILLIAM IP PLLC

(57) ABSTRACT

The disclosure describes various aspects of crowdsourcing traffic data for automatic and dynamic benchmarking of applications. In an aspect, an intelligence layer, communicatively coupled to a data collection layer and a visualization layer, is configured to receive traffic data from data sources (e.g., physical appliances, probes) in the data collection layer, the data sources being associated with multiple customers, and the traffic data being associated with at least one application (e.g., word processing, video streaming) used by the multiple customers. The intelligence layer is a cloud-based layer further configured to process the traffic data to determine performance thresholds for the at least one application, and may send one or more of the performance thresholds to a data source for a different customer to be used for benchmarking the at least one application for the different customer.

28 Claims, 6 Drawing Sheets

(56) References Cited

U.S. PATENT DOCUMENTS

| | | | | |
|---|---|---|---|---|
| 8,332,263 | B2* | 12/2012 | Ramesh | G06Q 99/00 705/7.39 |
| 8,335,661 | B1* | 12/2012 | Satish | G06F 11/302 702/186 |
| 8,626,545 | B2* | 1/2014 | Van Pelt | G06Q 10/06398 705/7.13 |
| 8,718,910 | B2* | 5/2014 | Gueziec | G08G 1/0112 701/119 |
| 8,745,617 | B1* | 6/2014 | Stekkelpak | G06F 9/44505 717/173 |
| 8,930,123 | B2* | 1/2015 | Srivastava | G01C 21/3492 701/119 |
| 9,047,774 | B2* | 6/2015 | Tseng | G08G 1/0112 |
| 9,124,498 | B2* | 9/2015 | Jung | H04L 41/5051 |
| 9,240,082 | B2* | 1/2016 | Marathe | G08G 1/0967 |
| 9,508,202 | B2* | 11/2016 | Marathe | G07C 5/0808 |
| 9,762,461 | B2* | 9/2017 | Raghunathan | H04L 43/08 |
| 9,967,278 | B2* | 5/2018 | Jevans | H04W 12/37 |
| 10,037,393 | B1* | 7/2018 | Polovick | G06Q 10/10 |
| 10,097,576 | B2* | 10/2018 | Jevans | G06F 21/56 |
| 10,554,508 | B2* | 2/2020 | Boerner | H04L 41/5019 |
| 10,592,378 | B1* | 3/2020 | Tali | G06F 11/3409 |
| 10,706,473 | B2* | 7/2020 | Vaidyanathan | G06Q 40/06 |
| 2005/0091102 | A1* | 4/2005 | Retsina | G06Q 10/06393 705/7.39 |
| 2014/0039985 | A1* | 2/2014 | Oleson | G09B 7/00 705/7.41 |
| 2014/0082047 | A1* | 3/2014 | Krannich | G06Q 10/103 709/203 |
| 2014/0201714 | A1* | 7/2014 | Vaidyan | G06F 11/3668 717/124 |
| 2014/0380413 | A1* | 12/2014 | Archer | H04L 63/20 726/1 |
| 2015/0154867 | A1* | 6/2015 | Tseng | G08G 1/0112 340/905 |
| 2017/0161281 | A1* | 6/2017 | Bhartia | H04W 4/21 |
| 2017/0178045 | A1* | 6/2017 | Wasik | G06Q 10/06393 |
| 2017/0264749 | A1* | 9/2017 | Wu | H04W 24/08 |
| 2017/0353482 | A1* | 12/2017 | Sommer | H04L 63/1433 |
| 2018/0121657 | A1* | 5/2018 | Hay | G06F 21/51 |
| 2018/0359277 | A1* | 12/2018 | Jevans | G06F 21/56 |
| 2019/0036828 | A1* | 1/2019 | Bajaj | H04L 45/302 |
| 2019/0114570 | A1* | 4/2019 | Prasad | G06Q 10/067 |
| 2019/0325307 | A1* | 10/2019 | Li | G06N 3/08 |
| 2020/0065736 | A1* | 2/2020 | Relangi | G06Q 10/0639 |
| 2020/0151080 | A1* | 5/2020 | Adler | G06N 5/02 |
| 2020/0242000 | A1* | 7/2020 | Khosrowpour | G06F 11/3608 |
| 2020/0304381 | A1* | 9/2020 | Wang | H04W 24/04 |
| 2021/0004913 | A1* | 1/2021 | Eder | G06Q 40/12 |
| 2021/0019247 | A1* | 1/2021 | Hurley | G06F 11/324 |
| 2021/0064401 | A1* | 3/2021 | Vichare | G06F 9/45525 |
| 2021/0319402 | A1* | 10/2021 | Ramaswamy | G06F 16/176 |

* cited by examiner

100

AUTOMATIC AND DYNAMIC PERFORMANCE BENCHMARKING AND SCORING OF APPLICATIONS BASED ON CROWDSOURCED TRAFFIC DATA

A CROSS REFERENCE TO RELATED APPLICATION(S)

This application claims the benefit of U.S. Provisional Application Ser. No. 62/829,861, entitled "AUTOMATIC AND DYNAMIC PERFORMANCE BENCHMARKING AND SCORING OF APPLICATIONS BASED ON CROWDSOURCED TRAFFIC DATA" and filed on Apr. 5, 2019, which is expressly incorporated by reference herein in its entirety.

INTRODUCTION

Aspects of the present disclosure generally relate to benchmarking applications to determine whether they are performing to an acceptable level, and more specifically, to techniques for automatic and dynamic performance benchmarking and scoring of one or more applications used by one customer based on crowdsourced traffic data collected from multiple customers.

In today's enterprise environment, customers tend to use a wide range of applications across one or more sites in their networks. These applications can include many different types such as but not limited to word processing and spreadsheet applications (e.g., Microsoft Office 365), customer relationship management (CRM) applications (e.g., Salesforce), video streaming applications (e.g., Netflix), and video sharing applications (e.g., YouTube).

It is important to determine if the performance of these applications is acceptable, otherwise remedial actions may need to be taken depending on whether the issue causing performance degradation is at the user level, the application level, the site level, or the network level, for example.

Currently, benchmarking and calibrating applications in order to characterize their real-time performance tends to be done at the time of installation or initialization, and using performance thresholds that remain fixed. This type of baselining is very limited and is unable to adjust as conditions in which the application operates change, or as the application itself changes (e.g., updates or newer versions). Accordingly, it is also desirable to implement techniques that simply and efficiently improve the ability of a customer to benchmark or baseline an application over time.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, a system for automatic and dynamic performance benchmarking and scoring of applications (e.g., word processing application, video streaming application) is described having an intelligence layer communicatively coupled to a data collection layer and a visualization layer, the intelligence layer is configured to receive traffic data from data sources (e.g., probes in the network) in the data collection layer, the data sources are associated with multiple customers, and the traffic data is associated with at least one application used by the multiple customers. The intelligence layer is further configured to process the traffic data to determine performance thresholds for the at least one application, and to send one or more of the performance thresholds to a data source for a different customer to be used for benchmarking the at least one application for the different customer.

In connection with the system, the data source for the different customer may be configured to benchmark or baseline the at least one application using the one or more performance thresholds sent by the intelligence layer to produce an index value (e.g., experience score), where the visualization layer is configured to generate a graphical representation of the index value for display to a user associated with the different customer. The index value may range from 0 to N, N being an integer number (e.g., N=100), and where the at least one application has a better performance as benchmarked against the one or more performance thresholds when the index value is closer to N than when it is closer to 0.

In another aspect of the disclosure, a method for automatic and dynamic performance benchmarking and scoring of applications is described that includes receiving, at an intelligence layer communicatively coupled to a data collection layer and a visualization layer, traffic data from data sources in the data collection layer, the data sources being associated with multiple customers, and the traffic data being associated with at least one application used by the multiple customers. The method further includes processing the traffic data to determine performance thresholds for the at least one application, and sending one or more of the performance thresholds to a data source for a different customer to be used for benchmarking the at least one application for the different customer.

In connection with the method, benchmarking the at least one application using the one or more performance thresholds sent by the intelligence layer includes producing an index value, where the method further includes having the visualization layer generate a graphical representation of the index value for display to a user associated with the different customer. The index value may range from 0 to N, N being an integer number (e.g., N=100), and where the at least one application has a better performance as benchmarked against the one or more performance thresholds when the index value is closer to N than when it is closer to 0.

In another aspect of the disclosure, a computer-readable medium having code executable by a processor for automatic and dynamic performance benchmarking and scoring of applications is described that includes code for receiving, at an intelligence layer communicatively coupled to a data collection layer and a visualization layer, traffic data from data sources in the data collection layer, the data sources being associated with multiple customers, and the traffic data being associated with at least one application used by the multiple customers. The computer-readable medium further includes code for processing the traffic data to determine performance thresholds for the at least one application, and code for sending one or more of the performance thresholds to a data source for a different customer to be used for benchmarking the at least one application for the different customer.

The system, method, and computer-readable medium described herein allow for automatic adjustments in performance thresholds over time by using crowdsourced traffic data to enable the dynamic benchmarking of applications.

This is in contrast with more traditional techniques that rely on an initial benchmarking and calibration of applications that remain fixed over time.

BRIEF DESCRIPTION OF THE DRAWINGS

The appended drawings illustrate only some implementation and are therefore not to be considered limiting of scope.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Tools may be used to characterize network performance issues and issues related to the internal performance of applications, but tools are needed to help bridge the gap between a network and applications. The present application provides a platform (see e.g., FIGS. 2A and 2B) that allows for the management of performance aspects that fall outside the scope of the network performance management tools and the applications performance management tools but that are of great interest to customers. Within this platform, it is possible to implement techniques that simply and efficiently improve the ability of a customer to benchmark or baseline an application over time by using traffic data collected from other customers (e.g., crowdsourced traffic data) in order to determine more applicable performance thresholds to use for the benchmarking or baselining. As used herein, the term benchmarking may refer to the setting of a baseline or guideline from which the performance of an application can be characterized, while the term scoring may refer to a numerical representation (e.g., an index value) of a comparison between a current performance of an application and its benchmark or baseline.

Figure 1:
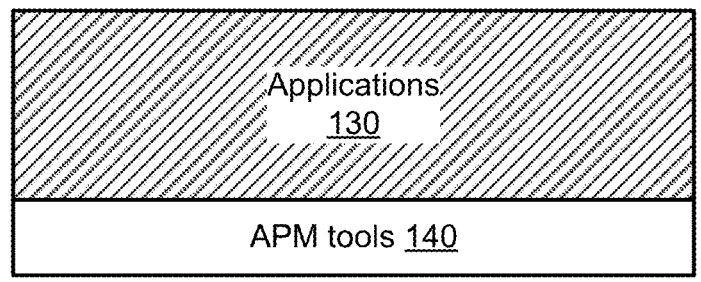
FIG. 1 illustrates an example of network and applications performance management tools, in accordance with aspects of this disclosure.
Figure 1:
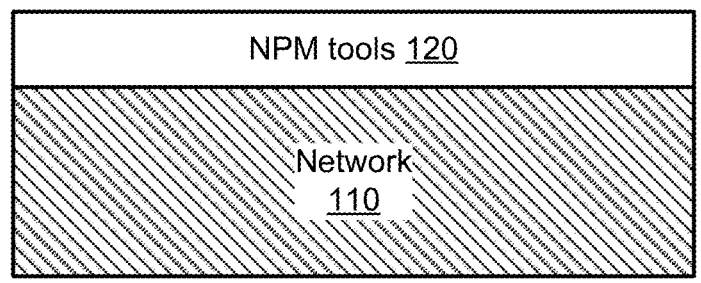

FIG. 1 illustrates a diagram 100 that shows an example of network and applications performance management tools, in accordance with aspects of this disclosure. In this example, a stack representative of a customer's environment is described having a network 110 at the bottom followed by network performance management (NPM) tools 120 sitting over the network 110. At the top of the stack are application performance management (APM) tools 140 and sitting on top of the APM tools 140 are applications 130. The NPM tools 120 include software to manage or characterize the performance of the network 110, while the APM tools 140 include software that operates with the applications 130 to characterize how the applications 130 are performing internally.

The applications 130 may include one or more applications. Non-limiting examples of applications include a word processing application (e.g., Microsoft Office 365), a spreadsheet application (e.g., Microsoft Office 365), a database application (e.g., Oracle), a video streaming application (e.g., Netflix), a video sharing application (e.g., YouTube), a web browsing application (e.g., Chrome), a design application, a collaborative application, a customer relationship management (CRM) application (e.g., Salesforce), or any combination thereof.

A blind spot (e.g., a user experience gap) exists between the network 110/the NPM tools 120 and the APM tools 140/the applications 130. It may be desirable to look at the performance of applications 130 outside the scope of what the NPM tools 120 can do on the network 110 and what the APM tools 140 can do within the applications 130 for a particular customer. One way to do so is to look at the traffic data (e.g., data packets) associated with the applications 130 to determine, for example, which users are doing what, how much of each application 130 is being used, how many of the applications 130 are being used across the business, and the like. That is, by tracking those performance aspects associated with the applications 130 that are not characterized or monitored by the NPM tools 120 and/or the APM tools 140 it is possible for a customer to get additional insight into the performance of the applications 130. For example, the NPM tools 120 and/or the APM tools 140 may be used to determine how much a particular application 130 is being used, but they may not be able to characterize whether the performance associated with such usage is positive or negative. Additional techniques may be needed not only to determine whether a particular application 130 is operating slowly (e.g., its response time performance is below a certain performance threshold), but may also be able to identify why it is slower than the performance threshold. With this information, a customer can be notified that potential issues exist before a user reports the issue. It is then possible for the customer to determine if the performance degradation is the result of, for example, the network, the application, or the cloud (if a cloud-based application is being provided). By providing such detection and notification assistance, the customer can then have the appropriate person or team, whether it is the network manager, the application manager, or the cloud manager, figure out what is needed to correct for the less than ideal performance. More details regarding the implementation of techniques and/or tools for managing application performance aspects other than those obtained from, for example, the NPM tools 120 and/or the APM tools 140, are provided below in connection with FIGS. 2A and 2B.

Figure 2A:
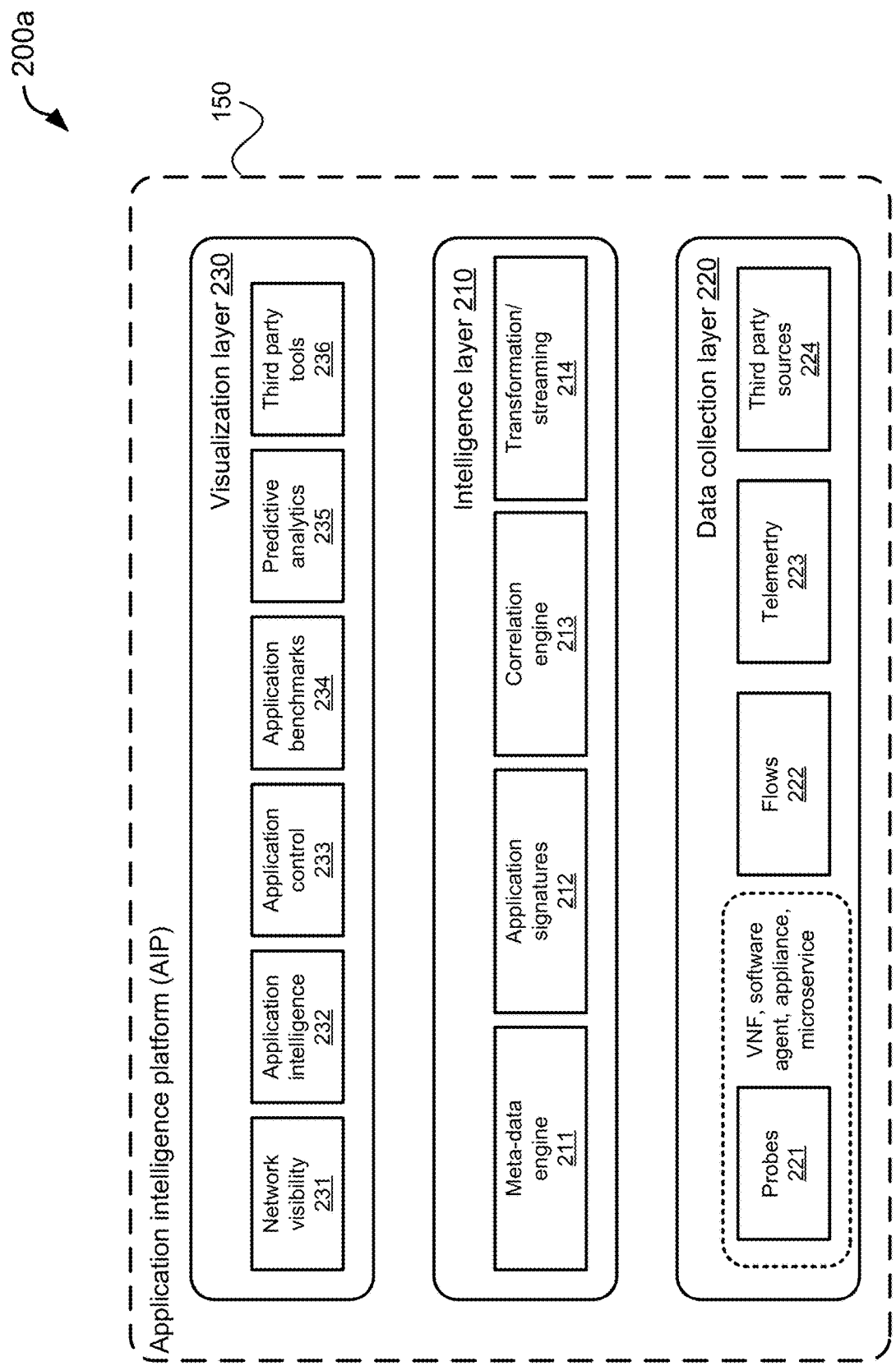
FIG. 2A illustrates an example of an application intelligence platform that bridges the intelligence gap, in accordance with aspects of this disclosure.

FIG. 2A illustrates a diagram 200a that shows an example of application intelligence platform (AIP) 150, in accordance with aspects of this disclosure. The AIP 150 includes a cloud-based intelligence layer 210 that is communicatively coupled to a data collection layer 220 and a visualization layer 230. In some cases, the visualization layer 230, or at least portions of it, may also be cloud-based. Some parts of the data collection layer 220 may be cloud-based, although in some examples parts of the data collection layer 220 are not implemented in a cloud.

The data collection layer 220 includes probes 221, which are boxes (e.g., physical or virtual boxes) that are used to collect packets in a wire (e.g., traffic data). A customer would deploy one or more probes 221 in their network to collect the appropriate information. The concept of the probes 221 may be extended to include virtual network function (VNF), software agents, physical appliances, microservices, and the like. The data collection layer 220 may also include flows 222, telemetry 223, and/or third party sources 224. All these, along with the probes 221, constitute different types of data sources that may be used in the data collection layer 220 to collect packet information.

The information collected by the data collection layer 220 is sent to the intelligence layer 210 where the information is processed by one or more components. For example, the intelligence layer 210 may include a meta-data engine 211, an application signatures component 212, a correlation engine 213, and/or a transformation/streaming component 214. The intelligence layer 210 may include other components (not shown) to perform additional functions and/or may use some of the components shown to perform the additional functions.

The visualization layer 230 includes tools and other components to help a customer, or user associated with the customer, to visualize, represent, or report information regarding the performance of applications being tracked or managed by the AIP 150. In this non-limiting example, the visualization layer 230 may include a network visibility component 231, an application intelligence component 232, an application control component 233, an application benchmarks component 234, and/or third party tools 236. Optionally, the visualization layer 230 may include a predictive analytics component 235, which in some cases may be provided or supported by a third party.

In general, the probes 221 (or any other data source) collect traffic data associated with one or more applications (e.g., the applications 130) from a customer's network, the traffic data is then sent to the intelligence layer 210 for storage and processing, including performing correlation operations and/or machine learning (ML) operations, and at least some the information generated by the intelligence layer 210 and/or the traffic data collected by the data collection layer 220 may be displayed in a user interface (UI) to indicate the performance of the one or more applications to the customer so that if the performance is poor in any or all of the applications the customer may take remedial actions.

Figure 2B:
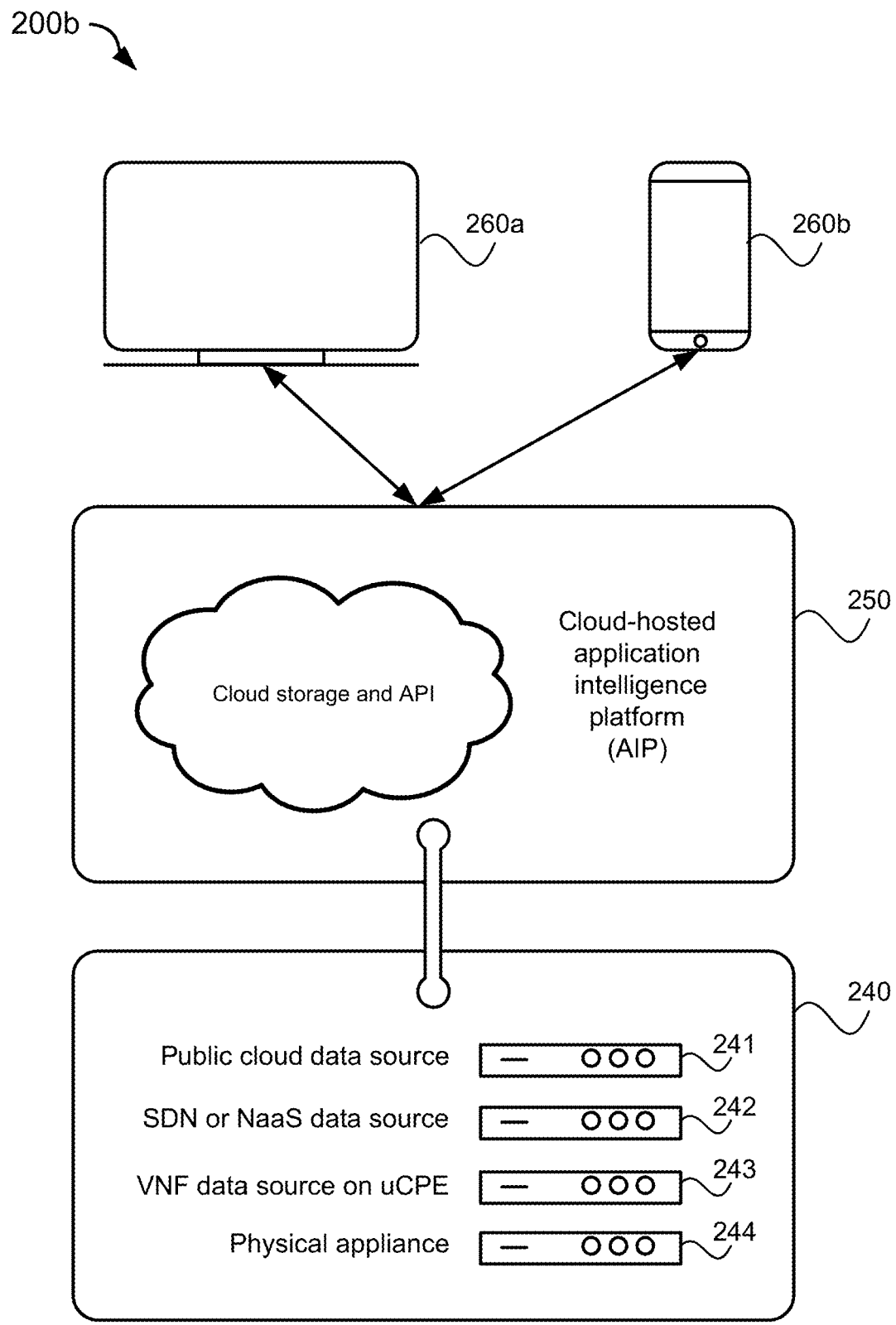
FIG. 2B illustrates another example of the application intelligence platform, in accordance with aspects of this disclosure.

FIG. 2B illustrates a diagram 200b that shows another representation of the layers described above in connection with the API 150 in FIG. 2A, in accordance with aspects of this disclosure. As mentioned above, the API 150 may include the intelligence layer 210, the data collection layer 220, and the visualization layer 230. The intelligence layer 210 and at least portion of the visualization layer 230 may be implemented in a cloud-hosted solution 250 that provides both cloud storage and application programming interfaces (APIs).

Data sources 240 in FIG. 2B may be examples of the data sources used in the data collection layer 220, which may or may not be implemented in a cloud. The data sources 240 may include, but need not be limited to, a public cloud data source 241, a software-defined network (SDN) or network as a service (NaaS) data source 242, a VNF data source on universal customer premises equipment (uCPE) 243, a virtual appliance, and/or a physical appliance (e.g., physical box) 244.

Information (e.g., graphical information) provided by or through the visualization layer 230 may be displayed on UIs in different types of devices including desktops or laptops 260a and/or in mobile devices 260b through mobile applications (e.g., iOS- or Android-based apps).

As mentioned above, the benchmarking and calibration of applications to characterize their real-time performance may be done at the time of installation or initialization, and using performance thresholds that remain fixed. This type of baselining is very limited and is unable to adjust as conditions in which the application operates change, or as the application itself changes (e.g., updates or newer versions). With the API 150 described above, it is possible to collect information from many customers (e.g., crowdsourcing) that use the same application(s) and then use this information to provide better performance thresholds or baselines over time, thereby allowing for a simple and efficient way improve the ability of a customer to benchmark an application over time. In other words, the API 150 allows for information to be collected for a particular application from multiple customers to then provide updated or adjusted performance thresholds for that application to allow better benchmarking of that application over time. This approach can be segmented, for example, by having customers in certain geographic regions and/or industries have their performance thresholds updated with information from other customers in the same geographic regions and/or industries.

In this regard, the present disclosure describes a system (e.g., the API 150) for automatic and dynamic benchmarking of applications. The system includes an intelligence layer (e.g., the intelligence layer 210) communicatively coupled to a data collection layer (e.g., the data collection layer 220) and a visualization layer (e.g., the visualization layer 230). The intelligence layer is configured to receive traffic data from data sources (e.g., the probes 221, the data sources 240) in the data collection layer, where the data sources are associated with multiple customers, where the traffic data is associated with at least one application (e.g., the applications 130) used by the multiple customers. The intelligence layer is further configured to process the traffic data to determine performance thresholds (e.g., time response thresholds) for the at least one application, and to send one or more of the performance thresholds to a data source for a different customer to be used for benchmarking the at least one application for the different customer. It may be the case that the different customer is part of the multiple customers such that its own traffic data is used to determine the performance thresholds. The performance thresholds may indicate a minimum acceptable value of a performance metric associated with the at least one application. The performance thresholds may be based on different types of segments, such as geographic segments and/or industry segments, where the customer may be able to select which type of performance threshold segment is preferable to use when benchmarking its applications.

The system may be described as a platform that includes the intelligence layer and at least one of the data collection layer and the visualization layer, where the intelligence layer is a cloud-based layer (see e.g., FIG. 2B).

In this system, one or more of the data sources are connected to a network associated with a respective one of the multiple customers, and the one or more data sources collect traffic data for the respective customer and send the collected traffic data to the intelligence layer.

In this system, the at least one application may include two or more applications, the performance thresholds that are determined may therefore include one or more performance thresholds for each of the two or more applications.

In this system, the intelligence layer (e.g., one of its components) may be configured to periodically query the data traffic received from the data sources to determine information associated with the performance of the at least one application, and the information determined from the traffic data may be used to determine the performance thresholds for the at least one application. The intelligence layer may be further configured to receive instructions (e.g., from a customer or user associated with the customer) identifying which performance thresholds to determine by processing the traffic data. For example, a customer may prefer to benchmark its applications to customers in similar industries and may therefore provide such instructions to the intelligence layer (e.g., via the visualization layer 230) such that the performance thresholds determined by the intelligence layer are consistent with the customer's preferred segment.

In this system, the data source for the different customer is configured to benchmark the at least one application using the one or more performance thresholds sent by the intelligence layer to produce an index value indicative of how well the application is performing in relation to the performance thresholds. The visualization layer may be configured to generate a graphical representation of the index value for display to a user associated with the different customer. In a non-limiting example, the index value may range from 0 to N, N being an integer number, and the at least one application is considered to have a better performance as benchmarked against the one or more performance thresholds when the index value is closer to N than when it is closer to 0. For example, if a word processing application has a response time of 2 seconds and the performance threshold in a related segment (e.g., geographic segment and/or industry segment) is 5 seconds, then the index value produced for that application may be high to indicate a good performance. But if instead the performance threshold for the related segment is 1 second, then the index value produced for that application may be low to indicate a poor or fair performance.

Figure 3:
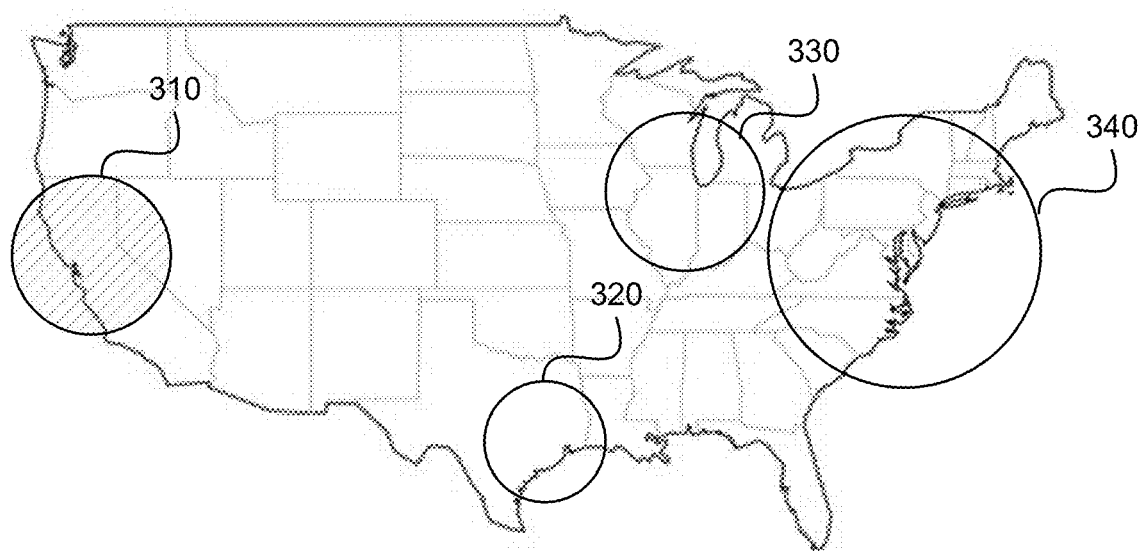
FIG. 3 illustrates an example visualization of an index value produced by the dynamic benchmarking enabled by the application intelligence platform, in accordance with aspects of this disclosure.

FIG. 3 illustrates a diagram 300 that shows an example visualization of the index value produced by the dynamic benchmarking described above, in accordance with aspects of this disclosure. In this example, various circles are shown on a map to characterize the performance of a particular application (e.g., one of the applications 130) for one customer, where each circle may represent a different site of the customer's business network, a size of the circle may represent a number of users on that site, and a color or shading of the circle may indicate whether its performance is good or bad according to the corresponding index value determined as described above. In other words, the circles may be used as graphical representations of the performance of that particular application in different customer sites.

In this example, the customer's business network includes four sites, a first site 310 (San Francisco), a second site 320 (Houston), a third site 330 (Chicago), and a fourth site 340 (New York City). The fourth site 340 has the largest number of users, but like the second site 320 and the third site 330, their circles are clear indicating that the particular application being characterized is performing well in those sites (e.g., the index value for that application in each of those sites if fairly high). For the first site 310, however, the corresponding circle is shown with hatched lines to indicate that the particular application being characterized is not performing well in that site and remedial action may be needed.

It is to be understood that the example in FIG. 3 is provided by way of illustration and not of limitation, and there may be many different ways in which graphical representations may be used to indicate the performance of a particular application based on an index value produced based on the performance of the application relative to a respective performance threshold.

Figure 4:
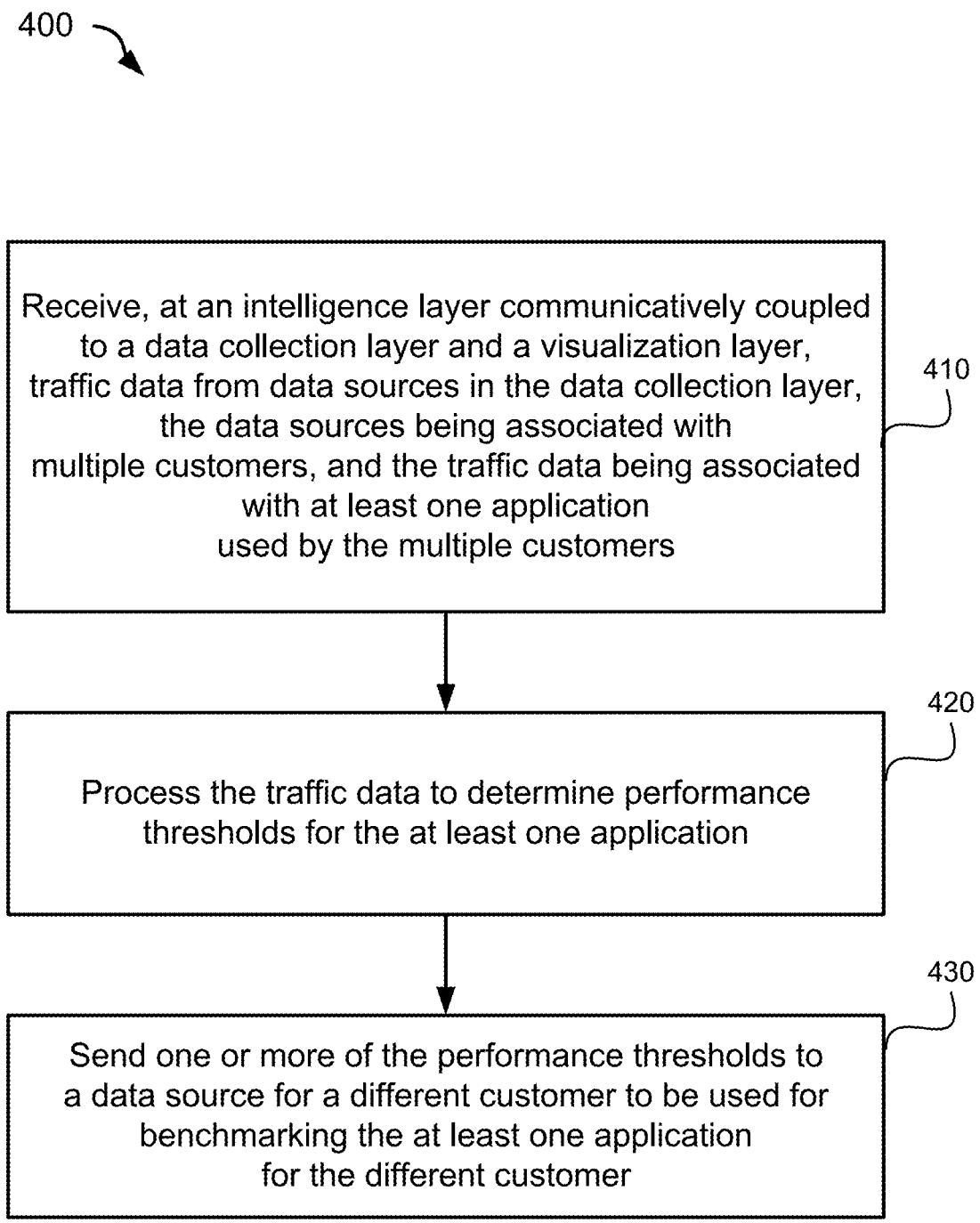
FIG. 4 illustrates an example of a flow diagram describing a method for automatic and dynamic benchmarking of applications, in accordance with aspects of this disclosure.

FIG. 4 illustrates an example of a flow diagram describing a method 400 for automatic and dynamic benchmarking of applications, in accordance with aspects of this disclosure. Aspects of the method 400 may be performed by one or more processors using one or more memories, whether these are available in cloud-based environment, local to a customer's premises, and/or remotely at a service providers' facilities or resources. The memory and the one or more processors may be configured to perform the aspects of the method 400 in FIG. 4, as well as additional aspects described herein.

At 410, the method 400 includes receiving, at an intelligence layer (e.g., the intelligence layer 210) communicatively coupled to a data collection layer (e.g., the data collection layer 220) and a visualization layer (e.g., the visualization layer 230), traffic data from data sources in the data collection layer. The data sources (e.g., the probes 221, the data sources 240) are associated with multiple customers, and the traffic data is associated with at least one application (e.g., the applications 130) used by the multiple customers. The intelligence layer and at least one of the data collection layer and the visualization layer may be part of a platform such as the API 150 described above.

At 420, the method 400 includes processing the traffic data to determine performance thresholds (e.g., time response thresholds) for the at least one application.

At 430, the method 400 includes sending one or more of the performance thresholds to a data source for a different customer to be used for benchmarking the at least one application for the different customer. It may be the case that the different customer is part of the multiple customers such that its own traffic data is used to determine the performance thresholds. The performance thresholds may indicate a minimum acceptable value of a performance metric associated with the at least one application. The performance thresholds may be based on different types of segments, such as geographic segments and/or industry segments, where the customer may be able to select which type of performance threshold segment is preferable to use when benchmarking its applications.

In an aspect of the method 400, one or more of the data sources are connected to a network associated with a respective one of the multiple customers, the method 400 further includes having the one or more data sources collect traffic data for the respective customer and send the collected traffic data to the intelligence layer.

In another aspect of the method 400, the at least one application includes two or more applications, and the performance thresholds may therefore include one or more performance thresholds for each of the two or more applications.

In another aspect of the method 400, benchmarking the at least one application using the one or more performance thresholds sent by the intelligence layer includes producing an index value (also referred to as scoring), the method 400 further includes having the visualization layer generate a graphical representation of the index value for display to a user associated with the different customer (see e.g., FIG. 3). In an example, the index value ranges from 0 to N, N being an integer number (e.g., N=100), and the at least one application has a better performance as benchmarked against the one or more performance thresholds when the index value is closer to N than when it is closer to 0.

In another aspect of the method 400, processing the traffic data includes periodically querying the data traffic received from the data sources to determine information associated with the performance of the at least one application, and the information determined from the traffic data is then used to determine the performance thresholds for the at least one application.

In yet another aspect of the method 400, the method 400 may further include receiving at the intelligence layer instructions identifying which performance thresholds to determine by processing the traffic data.

In addition to the system and method described above, the present disclosure also describes a computer-readable medium having code executable by a processor for automatic and dynamic benchmarking of applications, where the computer-readable medium includes code for receiving, at an intelligence layer (e.g., the intelligence layer 210) communicatively coupled to a data collection layer (e.g., the data collection layer 220) and a visualization layer (e.g., the visualization layer 230), traffic data from data sources in the data collection layer, the data sources (e.g., the probes 221, the data sources 240) being associated with multiple customers, and the traffic data being associated with at least one application (e.g., the applications 130) used by the multiple customers. The computer-readable medium may further include code for processing the traffic data to determine performance thresholds for the at least one application, and code for sending one or more of the performance thresholds to a data source for a different customer to be used for benchmarking the at least one application for the different customer. The same or similar features described above in connection with the system and method are applicable to the computer-readable medium.

Aspects of the methods and systems described herein may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 5:
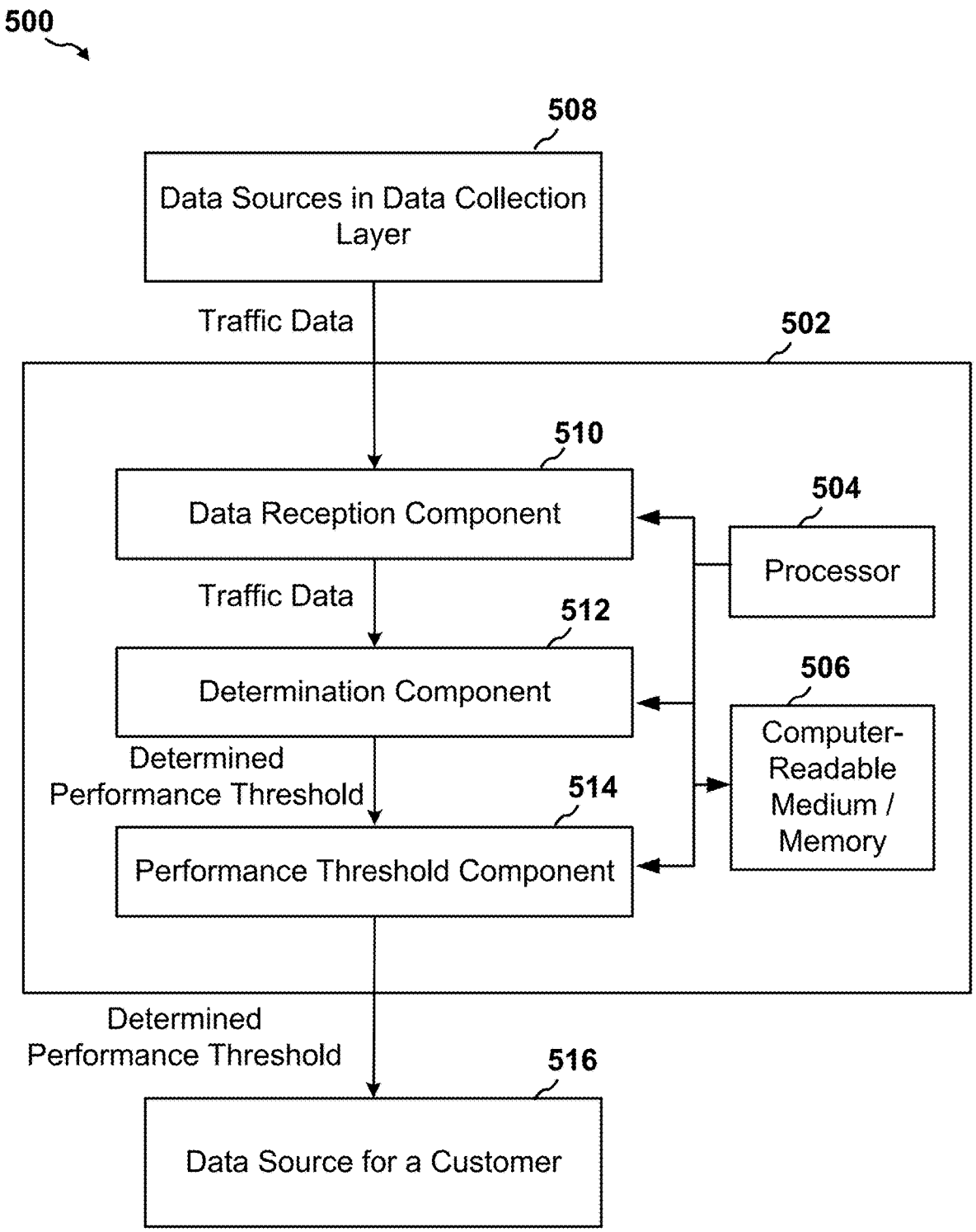
FIG. 5 illustrates and example system configured to perform a method for automatic and dynamic benchmarking of applications, in accordance with aspects of this disclosure.

For example, FIG. 5 illustrates an example system 500 that may be configured to perform the aspects of method 400 in FIG. 4. The system may include memory 506 and at least one processor 504 configured to perform the aspects described in connection with FIG. 4. For example, an intelligence layer 502 may include a data reception component 510 configured to receive traffic data from data sources in the data collection layer 508 (e.g., as described in connection with 402 in FIG. 4); a determination component 512 configured to process the data traffic to determine performance thresholds for at least one application (e.g., as described in connection with 404 in FIG. 4); and a performance threshold component 514 configured to send one or more of the performance thresholds to a data source for a different customer 516 (e.g., as described in connection with 406 in FIG. 4).

Although the present disclosure has been provided in accordance with the implementations shown, one of ordinary skill in the art will readily recognize that there could be variations to the implementations and those variations would be within the scope of the present disclosure. Accordingly, many modifications may be made by one of ordinary skill in the art without departing from the scope of the appended claims.

What is claimed is:

1. A system comprising:
   a processor;
   a network interface; and
   a machine-readable medium having program code executable by the processor to cause the system to,
   obtain crowdsourced traffic data from distributed data sources via the network interface, wherein the crowdsourced traffic data comprise data packets collected from network sites of multiple customers and generated from applications being used by users of the multiple customers;
   determine a set of one or more performance thresholds for a first of the applications based, at least in part, on information from the crowdsourced traffic data; and
   score current performance of the first application at each network site of first customer with respect to the set of performance thresholds, wherein the first customer is different than the multiple customers.

2. The system of claim 1, wherein the distributed data sources comprise probes distributed across devices of the multiple customers.

3. The system of claim 1, wherein the performance thresholds include time response thresholds for at least the first application.

4. The system of claim 1, wherein the performance thresholds indicate a minimum acceptable value of a performance metric associated with the first application.

5. The system of claim 1, wherein the program code executable to score performance of the first application comprises program code executable by the processor to cause the system to produce, for each network site of the first customer, an index value based, at least in part, on the set of performance thresholds.

6. The system of claim 5, wherein the index value ranges from 0 to N, N being an integer number, and wherein the first application has a better performance for the different customer as benchmarked against the set of one or more performance thresholds when the index value is closer to N than when it is closer to 0.

7. The system of claim 1, wherein the distributed data sources include one or more of a public cloud data source, a software-defined network (SDN) or a network as a service (NaaS) data source, a virtual network function (VNF) on universal customer premises equipment (uCPE) data source, a virtual appliance, or a physical appliance.

8. The system of claim 1, wherein the machine-readable medium further has program code executable by the processor to cause the system to:
segment the crowdsourced traffic data into a plurality of segments of crowdsourced traffic data,
wherein the program code to determine the set of one or more performance thresholds for the first application comprises the program code executable by the processor to cause the system to determine, from each segment of crowdsourced traffic data, at least one performance threshold for the first application,
wherein the program code to score performance of the first application for each network site of the first customer comprises program code executable by the processor to cause the system to score performance of the first application for each network site of the first customer with respect to a first of the set of performance thresholds that was determined from a first segment of the crowdsourced traffic data based on selection of the first segment for the first customer.

9. The system of claim 8 wherein the plurality of segments corresponds to at least one of industry segments and geographic segments.

10. The system of claim 1, wherein the machine-readable medium further has program code that is executable by the processor to cause the system to:
obtain additional crowdsourced traffic data that includes application performance information for the first application; and
update the set of one or more performance thresholds based, at least in part, on information from the additional crowdsourced traffic data.

11. A method comprising:
obtaining crowdsourced traffic data from data sources across network sites of a plurality of customers, wherein the crowdsourced traffic data includes information about application performance for an application used by users of the plurality of customers;
determining a set of one or more performance thresholds for the application based, at least in part, on information from the crowdsourced traffic data; and
scoring current performance of the application at each network site of a first customer with respect to the set of one or more performance thresholds.

12. The method of claim 11, wherein the data sources comprise probes distributed across devices of the plurality of customers.

13. The method of claim 11, wherein the performance thresholds indicate a minimum acceptable value of a performance metric associated with the application.

14. The method of claim 11, wherein scoring current performance of the application for the first customer comprises producing an index value for each network site of the first customer based, at least in part, on the set of performance thresholds.

15. The method of claim 14, wherein the index value ranges from 0 to N, N being an integer number, and wherein the application has a better performance for the first customer as benchmarked against the set of one or more performance thresholds when the index value is closer to N than when it is closer to 0.

16. The method of claim 11, further comprising:
segmenting the crowdsourced traffic data into a plurality of segments of crowdsourced traffic data,
wherein determining the set of one or more performance thresholds for the application comprises determining, from each segment of crowdsourced traffic data, at least one performance threshold for the application,
wherein scoring performance of the application for the first customer comprises scoring performance of the application with respect to a first of the set of performance thresholds that was determined from a first segment of the crowdsourced traffic data based on selection of the first segment for the first customer.

17. The method of claim 16 wherein the plurality of segments corresponds to at least one of industry segments and geographic segments.

18. The method of claim 11, further comprising:
obtaining additional crowdsourced traffic data that includes application performance information for the application; and
updating the set of one or more performance thresholds based, at least in part, on information from the additional crowdsourced traffic data.

19. The method of claim 11, wherein the plurality of customers includes the first customer.

20. A non-transitory machine-readable medium having program code stored thereon, the program code to:
obtain crowdsourced traffic data from data sources across network sites of a plurality of customers, wherein the crowdsourced traffic data includes information about application performance for an application used by users of the plurality of customers;
determine a set of one or more performance thresholds for the application based, at least in part, on information from the crowdsourced traffic data; and
score current performance of the application at each network site of a first customer with respect to the set of performance thresholds.

21. The non-transitory machine-readable medium of claim 20, wherein the data sources comprise probes distributed across devices of the plurality of customers.

22. The non-transitory machine-readable medium of claim 20, wherein the performance thresholds indicate a minimum acceptable value of a performance metric associated with the application.

23. The non-transitory machine-readable medium of claim 20, wherein the program code to score current performance of the application for a first customer comprises program code to produce an index value for each network site of the first customer based, at least in part, on the set of performance thresholds.

24. The non-transitory machine-readable medium of claim 23, wherein the index value ranges from 0 to N, N being an integer number, and wherein the application has a better performance for the first customer as benchmarked against the set of one or more performance thresholds when the index value is closer to N than when it is closer to 0.

25. The non-transitory machine-readable medium of claim 20, further comprising program code to:
  segment the crowdsourced traffic data into a plurality of segments of crowdsourced traffic data,
  wherein the program code to determine the set of one or more performance thresholds for the application comprises program code to determine, from each segment of crowdsourced traffic data, at least one performance threshold for the application,
  wherein the program code to score performance of the application at each network site of the first customer comprises program code to score performance of the application at each network site with respect to a first of the set of performance thresholds that was determined from a first segment of the crowdsourced traffic data based on selection of the first segment for the first customer.

26. The non-transitory machine-readable medium of claim 25 wherein the plurality of segments corresponds to at least one of industry segments and geographic segments.

27. The non-transitory machine-readable medium of claim 20 further comprising program code to:
  obtain additional crowdsourced traffic data that includes application performance information for the application; and
  update the set of one or more performance thresholds based, at least in part, on information from the additional crowdsourced traffic data.

28. The non-transitory machine-readable medium of claim 20, wherein the plurality of customers includes the first customer.

* * * * *